(12) United States Patent
DeCusatis et al.

(10) Patent No.: US 8,427,951 B2
(45) Date of Patent: Apr. 23, 2013

(54) METHOD, SYSTEM, AND APPARATUS FOR RELIABLE DATA PACKET RECOVERY IN A LINK LAYER OF A DATA CENTER ETHERNET NETWORK

(75) Inventors: Casimer DeCusatis, Poughkeepsie, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 11/847,965

(22) Filed: Aug. 30, 2007

(65) Prior Publication Data

US 2009/0059916 A1    Mar. 5, 2009

(51) Int. Cl.
*G01R 31/08* (2006.01)
*H04L 12/28* (2006.01)

(52) U.S. Cl.
USPC ........... 370/235; 370/236; 370/242; 370/389; 370/412

(58) Field of Classification Search .................. 370/235, 370/236, 242, 389, 412
See application file for complete search history.

(56) References Cited

U.S. PATENT DOCUMENTS

| | | | |
|---|---|---|---|
| 6,046,979 A | 4/2000 | Bauman | |
| 6,728,210 B1 | 4/2004 | El-Khoury et al. | |
| 6,845,105 B1 | 1/2005 | Olsson et al. | |
| 7,000,021 B1 | 2/2006 | Radhakrishnan et al. | |
| 7,873,065 B1 * | 1/2011 | Mukerji et al. | 370/429 |
| 2001/0032325 A1 | 10/2001 | Fong et al. | |
| 2002/0057687 A1 | 5/2002 | Birkenmaier et al. | |
| 2003/0161320 A1 | 8/2003 | Valvo et al. | |
| 2004/0109443 A1 | 6/2004 | Gai et al. | |
| 2005/0213540 A1 * | 9/2005 | Matsumoto | 370/331 |
| 2006/0104303 A1 * | 5/2006 | Makineni et al. | 370/463 |
| 2006/0256746 A1 * | 11/2006 | Quick et al. | 370/315 |
| 2006/0256798 A1 * | 11/2006 | Quick et al. | 370/401 |

(Continued)

FOREIGN PATENT DOCUMENTS

EP    1816778 A2    8/2007

OTHER PUBLICATIONS

Andrew S. Tanenbaum, "Computer Networks", Prentice Hall, Chapter 3, Sec. 3.4, pp. 211-228, 4th Ed. (2003).*

(Continued)

*Primary Examiner* — Brandon Renner
(74) *Attorney, Agent, or Firm* — Cantor Colburn LLP; John Campbell

(57) ABSTRACT

Dropped packets are recovered in a link layer of a Data Center Ethernet (DCE) network. Data packets for transmission are stored in a replay buffer. Each data packet includes a header having a field including data indicating that the data packet is formatted for reliable recovery at the link layer. The data packets are transmitted to a receiver across a link layer in the DCE network. The receiver determines whether a data packet has been dropped. If a data packet has not been dropped, an acknowledgement signal is sent to the transmitter in another data packet across the link layer, indicating that the data packet has been received. If a data packet has been dropped, a non-acknowledgement signal is sent to the transmitter in the other data packet across the link layer, indicating that the data packet has been dropped. In response to receipt of the non-acknowledgement signal or no receipt of an acknowledgement signal after the timeout period, the dropped data packet is retrieved from the replay buffer and is resent to the receiver across the link layer.

20 Claims, 3 Drawing Sheets

U.S. PATENT DOCUMENTS

2007/0113140 A1    5/2007  Roh et al.
2007/0223379 A1*   9/2007  Sivakumar et al. ........... 370/235
2008/0025334 A1*   1/2008  Smith et al. .................. 370/412

OTHER PUBLICATIONS

Andrew S. Tanenbaum, "Computer Networks", Prentice Hall, Chapter 3, Sec. 3.4, pp. 184-187, $4^{th}$ Ed. (2003).*

Proposal for Traffic Differentiation in Ethernet Networks, [online][retried on Aug. 15, 2007]; retrieved from the Internet http://www.ieee802.ord/1/files/public/docs2005/new-wadekar-virtual°/020-links-0305.pdf.
PCT/EP2008/060920 Mailed Feb. 11, 2009; pp. 12.

* cited by examiner

METHOD, SYSTEM, AND APPARATUS FOR RELIABLE DATA PACKET RECOVERY IN A LINK LAYER OF A DATA CENTER ETHERNET NETWORK

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

The present invention relates generally to data packet recovery, and, in particular, to recovering lost data packets.

Data Center Ethernet (DCE) (also referred to as enhanced Ethernet or low latency Ethernet) is an emerging industry standard, which proposes modifications to existing networks, in an effort to position Ethernet as the preferred convergence fabric for all types of data center traffic. A recent study has found that Ethernet is the convergence fabric, with I/O consolidation in a Data Center as shown in FIG. 1. This consolidation is expected to simplify platform architecture and reduce overall platform costs. More details of proposals for consolidation are described in "Proposal for Traffic Differentiation in Ethernet Networks," available at http://www.ieee802.org/1/files/public/docs2005/new-wadekar-virtual%20-links-0305.pdf.

Major changes have been proposed for DCE, including the addition of credit based flow control at the link layer, congestion detection and data rate throttling, and the addition of virtual lanes with quality of service differentiation. It is important to note that these functions do not affect Transmission Control Protocol/Internet Protocol (TCP/IP), which exists above the DCE level. It should also be noted that DCE is intended to operate without necessitating the overhead of TCP/IP. This offers a much simpler, low cost approach that does not require offload processing or accelerators.

Previous versions of Ethernet standards relied on TCP to detect dropped or lost packets to initiate recovery or retransmission of data for end-to-end recovery. The bit error rate (BER) of such links has become a limiting factor in the design of large networks with many switches, since in large networks, each data packet needs to traverse more links in order to reach its destination. Also, as the data rate increases (e.g., from 10-40-100 Gbit/s), the BER increases. For example, a 10 Gbits/s Ethernet link in a 32 node switch fabric may require 12 switches with 8 ports each, and a typical packet undergoes at least 4 hops between switches before reaching its destination. More links make each packet more susceptible to link bit errors. Furthermore, the BER increases as data rates increase, since many link power penalties are proportional to data rates.

In order to address these concerns, an end-to-end link recovery mechanism has been proposed for layer 2 of the Ethernet stack. However, this approach depends on setting network timeout values properly, which introduces several practical problems. For example, timeout values tend to increase in larger networks in order to overcome local switch congestion issues. Shortening timeout too much causes needless retry attempts and slows throughput. This actually increases congestion and can perpetuate a cascaded network collapse. Setting timeouts too long slows recovery time, causing lower throughput. More complex recovery schemes, like Forward Error Correction (FEC) codes, require significant overhead and only recover certain types of errors. Thus, they do not function well in high BER environments.

SUMMARY

A method, system and apparatus are provided for recovering dropped packets in a Data Center Ethernet (DCE) network. Data packets for transmission are stored in a replay buffer in a transmitter. Each data packet includes a header having a field including data indicating that the data packet is formatted for reliable recovery at the link layer. The data packets are transmitted to a receiver across a link layer in the DCE network. The receiver receives the data packets transmitted across the link layer. A determination is made whether a data packet has been dropped. If a data packet is determined to have been dropped, a non-acknowledgement signal is sent from the receiver to the transmitter in another data packet across the link layer, indicating that the data packet transmitted to the receiver has been dropped. If a data packet is determined not to have been dropped, an acknowledgement signal is sent from the receiver to the transmitter in the other data packet across the link layer, indicating that the data packet transmitted from the transmitter has been received. If no acknowledgement signal is received after a timeout period, it is assumed that either the data packet transmitted to the receiver or the acknowledgment signal transmitted in the other data packet to the transmitter has been dropped. In response to receipt of the non-acknowledgement signal at the transmitter or in response to no receipt of an acknowledgement signal at the transmitter after the timeout period, the data packet is retrieved from the replay buffer in the transmitter, and the data packet is resent to the receiver across the link layer.

According to an exemplary embodiment, each data packet is assigned a packet sequence number. A determination is made whether a data packet is dropped by comparing a sequence number of a received packet with an expected sequence number. If the sequence number of the received packet is not the same as the expected sequence number, the data packet is assumed to have been dropped.

BRIEF DESCRIPTION OF THE DRAWINGS

Referring to the exemplary drawings, wherein like elements are numbered alike in the several Figures.

DETAILED DESCRIPTION

According to an exemplary embodiment, reliability at the link layer in a large DCE network is introduced. As those skilled in the art will appreciate, as packets are transmitted to the receiver, various errors may occur, such as flipped bits, noised introduced on the link, etc. Cyclic redundancy checking (CRC) may be used to detect such errors as explained in further detail below. A technique is proposed in which data packets containing errors, such as flipped bits, noised introduced on the link, etc., are dropped, and a combination of sequence numbers and timeout mechanisms at the link level of the network detects the missing packets. Thus, detection and recovery are added to the DCE link layer. This allows timeout periods to be sufficiently long to minimize false retry attempts due to fabric congestion. This implementation is capable of handling recovery for a very large switch fabric for clustering and I/O.

According to exemplary embodiments, existing hardware structure and link protocol may be modified by adding one or more replay buffers on the transmission side to retransmit dropped packets. Replay buffering for retransmission is independent of DCE virtual lanes or channel extension flow control buffers on the receiving side for inbound data only. The replay buffer only needs to be large enough to accomodate the link distance, processing time for Ack/Nak (introduced herein and described below), and maximum transmission unit (MTU) transmission and reception times. MTU refers to the size (in bytes) of the largest packet that a given layer of a communications protocol can pass onwards. It should be noted, however, that an entire data packet has to be received before it can be verified and before an Ack/Nak indication may be sent. According to an exemplary embodiment a low cost, write-mostly/read-seldomly buffer may be used. For example, a 10 Gbit/s link 100 m long with 4K payload may use about a 2K buffer.

Figure 1:
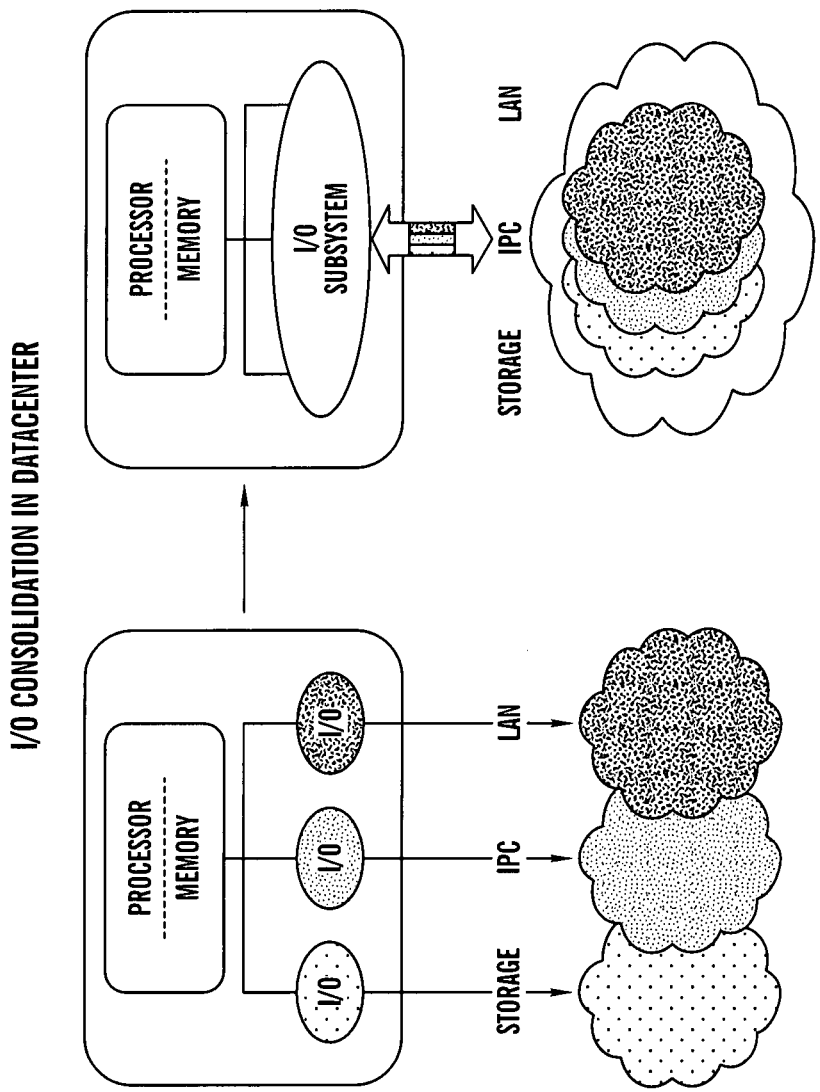
FIG. 1 illustrates a proposed consolidation of traffic in a Data Center Ethernet (DCE) network.
Figure 2:
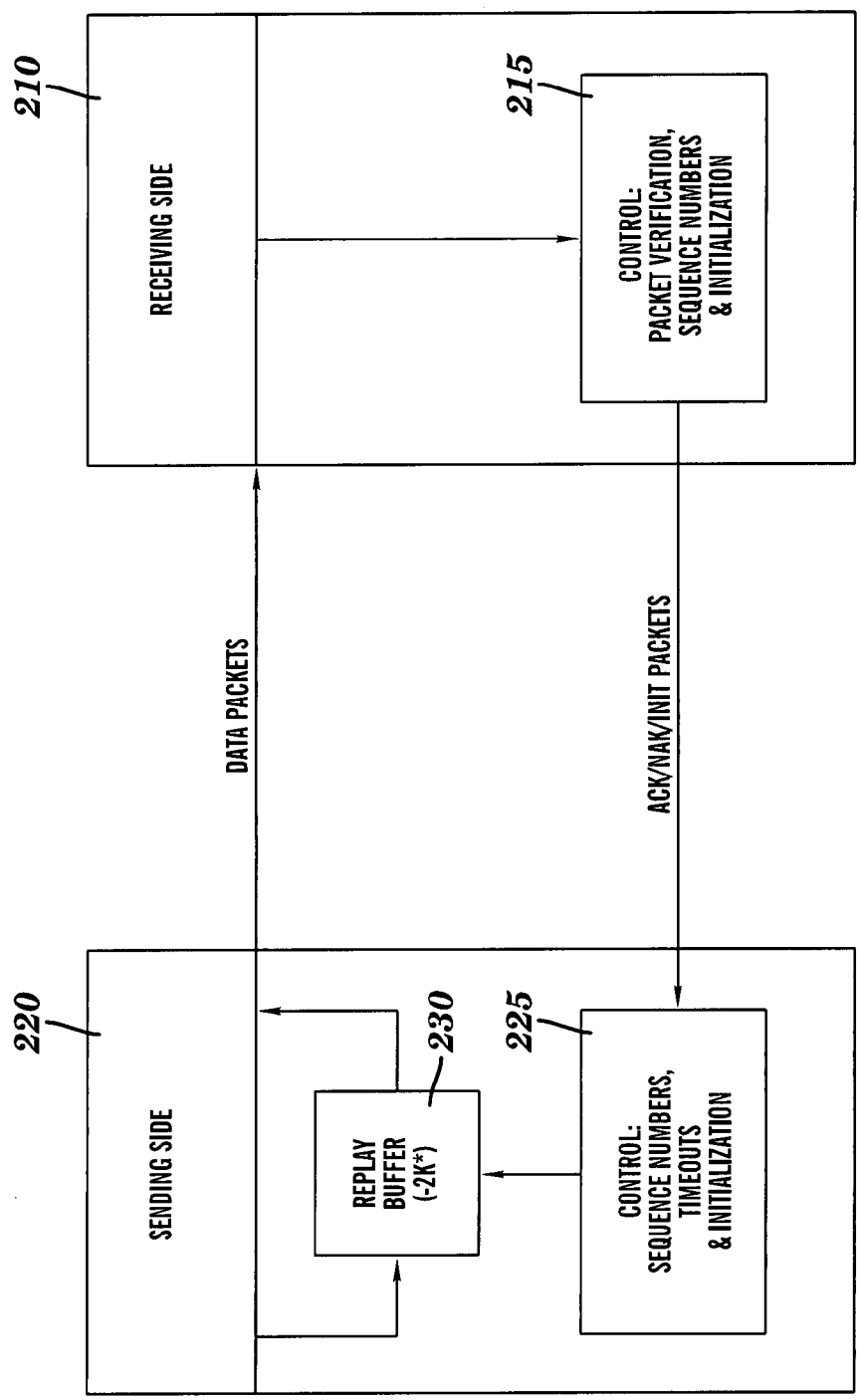
FIG. 2 illustrates the flow of dropped packet recovery in DCE architecture with an enhanced link layer according to an exemplary embodiment.

Referring to FIG. 2, which illustrates the flow of data packets through a reliable link level in a DCE network, each data packet transmitted from a transmitter (sending side) 220 has a packet sequence number (PSN). The data packets transmitted are also stored in a replay buffer 230 in case they are dropped and need to be retransmitted.

Packets are received and acknowledged/not acknowledged by a receiver (receiving side) 210 as they arrive from the transmitter across the link layer. The receiver 210 includes a control mechanism 215 that determines whether erroneous data has been received by comparing a CRC field in a transmitted packet with a CRC field in a received packet. The CRC field includes 4 bytes at the end of a data packet, after the payload. When the transmitter generates a packet, the CRC is generated by performing calculations on the headers and payload of the packet and then appending the result (known as CRC) at the end of the packet. When the receiver receives a packet, it performs the same calculations on the headers and payload. The CRC the receiver generates is compared to the CRC at the end of the packet received from the transmitter 220, and if the CRCs are the same, the receiver 210 concludes that the packet has been received without error. If the receiver determines that the packet is in error because the CRCs are not the same, it cannot trust any part of the packet. In fact, the receiver 210 might not even be able to tell if the received data is a data packet. The received data may just be noise. Thus, the receiver 210 discards this data as a bad packet.

Figure 4:
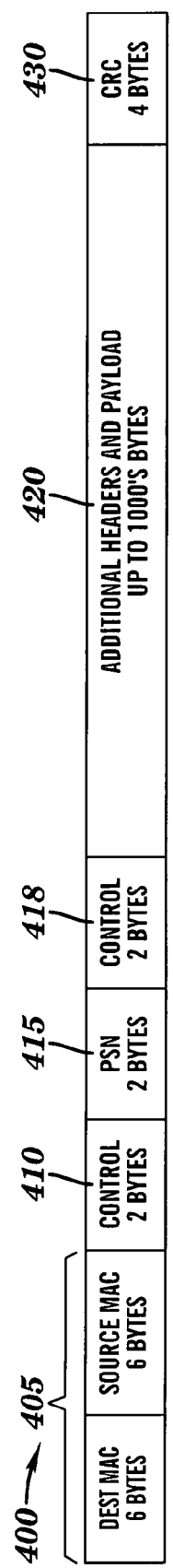
FIG. 4 illustrates a modified DCE Ethernet data packet including a field indicating DCE recovery capability according to an exemplary embodiment.

If the data received by the receiver 210 passes the CRC, the receiver 210 compares the PSN of the data packet to an expected PSN. A PSN is described in detail in commonly assigned, copending U.S. patent application Ser. No. 11/426, 421, herein incorporated by reference. Packets are verified based on the comparison of the PSN. If a packet with an expected PSN does not arrive, it is assumed that an error occurred, and that one or more packets were dropped. Thus, if a packet is received out of sequence, it is assumed that one or more packets were dropped. Depending on the PSN comparison results, the receiver 210 returns either an Ack (acknowledged) bit or a Nak (not acknowledged) bit in a header of a data packet as illustrated in FIG. 4. The receiver 210 also indicates the PSN that was last properly received. As part of an initialization process, the control mechanism 215 analyses information from the receiver 210 indicating the starting PSN as supplied in the Ack/Nak packet and returns this information to the transmitter 220.

According to an exemplary embodiment, if the transmitter 220 receives a Nak from the receiver 210, the transmitter 220 resends the data packet from the replay buffer. Absent receipt of a Nak signal, the transmitter 220 waits for receipt of an Ack signal indicating that the data packet was received. If the transmitter does not receive an Ack signal from the receiver 210 after a timeout period, either because, e.g., a packet was dropped or an Ack signal was lost, the transmitter 220 resends the data packet from the replay buffer 230. The data packet resent may be considered data packet N+1, where N is PSN for the data packet for which an Ack was last received by the transmitter 220.

According to an exemplary embodiment, the receiver 210 need not send an Ack for every data packet received, as the receiver may be busy with other tasks. Thus, the receiver may send an Ack for the last packet received. This is referred to as "coalescing of packets". If the transmitter "times out" before an Ack signal is received, it resends those packets sent since the last Ack was received.

Although not shown in FIG. 2 in the interest of simplicity of illustration, it should be appreciated that there may be many links, nodes, and switches in the switch fabric over which the data packets are sent from the transmitter 220 to the receiver 210. As a non-limiting example, the data packets may be transmitted across a node switch fabric including 32 or more nodes including 12 switches with 8 ports each. The features described above may be implemented on all the links in the fabric, or they may be tied to the DCE service levels and only impact some links in the fabric.

Figure 3:
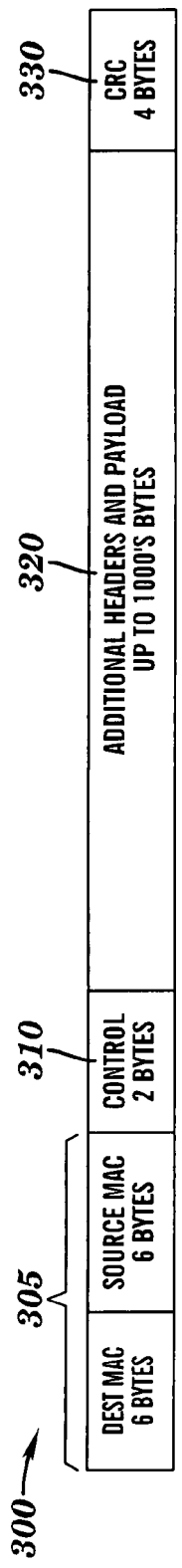
FIG. 3 illustrates an existing DCE Ethernet packet.

For illustrative purposes, FIG. 3 shows a DCE data packet 300, as it exists today. The packet includes a header including destination and source fields 305 and a 2 byte control field. The 2 byte control field contains information indicating the type of packet. The data packet also includes additional headers and a payload 320, followed by a CRC field 330.

FIG. 4 illustrates a DCE data packet 400, modified according to an exemplary embodiment, to include information indicating whether the enhanced DCE reliability link layer feature is used in the packet. A mix of reliable and normal packets is allowed. Those packets that are "reliable" contain the information indicating that the DCE reliability link layer feature is used in the packet. Referring to FIG. 4, the data packet includes a header including destination and source fields 405, similar to the fields 305 shown in FIG. 3. According to an exemplary embodiment, the data packet 400 also includes a 2 byte control field that 410 that is modified to include information indicating whether the packet is in a DCE standard format, or whether it is formatted to work with a DCE reliable link layer as described above. This control field 410 also includes a code indicating that there is a PSN field 415 following it and a normally defined control field 418 following that. Finally, the packet 400 includes additional headers and payload 420, and a CRC field 430. This formatting allows backward capability with the previous 802.3 IEEE Ethernet standards.

As indicated above, there may be many switches and links between the transmitter and the receiver. A standard DCE packet may be modified, as desired, at any point in the switch fabric between the transmitter and the receiver, to indicate that the reliability feature is enabled for the packet, as shown in FIG. 4. This may be useful, for example, for a data packet traversing a link that is known to be unreliable. Also, a data packet that has the reliability feature enabled may also be modified at any point, as desired, such that it takes the form of a standard DCE packet. This may be useful for a packet traversing a link that is known to be reliable, such that the reliability feature is not needed for that link.

Figure 5:
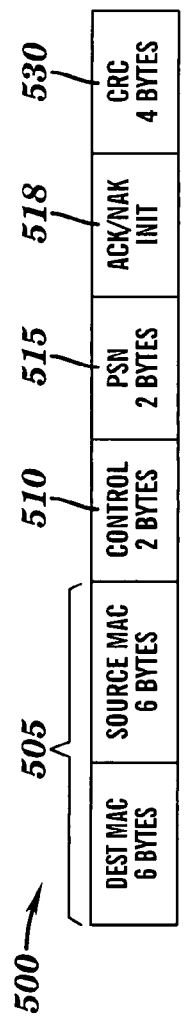
FIG. 5 illustrates a modified DCE Ethernet data packet including a field indicating acknowledgement or non-acknowledgement of receipt of packets according to an exemplary embodiment.

As illustrated in FIG. 5, a data packet 500 sent from the receiver to the transmitter is similar that shown in FIG. 4, in that it includes source and destination fields 505, a 2 byte control field 510, a PSN field 515, and a CRC field 530. A single code of the 2 byte control field 510 indicates that the packet is a DCE reliability link layer Ack/Nak/Init packet according to an exemplary embodiment. The data packet 500 also includes a field 518 containing the Ack/Nak and Init op code data introduced and described herein. The Ack/Nak/Init field 518 is shown as following the PSN field 515, such that the PSN field is in the same location within the packet for inbound and outbound packets. However, it should be appreciated that the locations of the fields 518 and 515 may be swapped, if desired.

According to exemplary embodiments, recovery is introduced at the DCE link layer using a small, low-cost replay buffer at the transmitter side. This results in faster and more robust than other proposed alternatives, such as end-to-end recovery and FEC codes, and can respond to any type of link degradation, including unusually high BER. PSN comparison may be used to detect lost data packets. This recovery feature may be implemented through a modified header in the DCE frame, thus making this feature backward compatible.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for recovering dropped data packets in a Data Center Ethernet (DCE) network, comprising:
   storing data packets for transmission in a replay buffer in a transmitter, the replay buffer accessible at a link layer of the network, wherein each data packet includes a header having a field that indicates if the data packet is formatted for reliable recovery at the link layer;
   transmitting the data packets to a receiver across a link layer in the DCE network;
   setting the field in the header of the data packet, while the packet is in transit over the network, the field enabling reliable recovery at the link layer, wherein setting the field to a first value causes links in the network to apply reliable recovery at the link layer to the data packet, and setting the field to a second value causes the data packet to pass through the links in the network without applying reliable recovery at the link layer to the data packet;
   receiving the data packets transmitted across the link layer;
   determining, at the link layer, whether a data packet has been dropped;
       receiving a non-acknowledgement signal from the receiver in another data packet across the link layer indicating that the data packet has been dropped, in response to determining that the data packet has been dropped; and
       receiving an acknowledgement signal from the receiver in the other data packet across the link layer indicating that the data packet has been received, the acknowledgement signal sent only after the last packet of the data packets is received at the receiver and in response to determining that none of the data packets have been dropped;
       wherein it is assumed that the data packet or the acknowledgement signal has been dropped, in response to determining that no acknowledgement signal is received after a timeout period; and
   in response to receipt of the non-acknowledgement signal at the transmitter or in response to no receipt of an acknowledgement signal at the transmitter after the timeout period, retrieving the data packet from the replay buffer, at the link layer; and
   resending the data packet to the receiver across the link layer;
   wherein the acknowledgement signal is received only after the last packet has been received by the recipient, responsive to the recipient being busy with other tasks.

2. The method of claim 1, wherein the data indicating that the data packet is formatted for reliable recovery at the link layer is included in a 2-byte field of the data packet header in the data packet transmitted to the receiver.

3. The method of claim 1, wherein each data packet is assigned a packet sequence number, and the step of determining comprises comparing a sequence number of a received packet with an expected sequence number, wherein if the sequence number of the received packet is not the same as the expected sequence number, the data packet is assumed to have been dropped.

4. The method of claim 1, wherein the timeout period is as long as the time it takes a data packet to traverse the link from the transmitter to the receiver and back, the time it takes to compare a data packet sequence number to an expected sequence number and generate an acknowledgement signal or a non-acknowledgement signal, and maximum transmission unit (MTU) transmission and reception times.

5. The method of claim 4, wherein the MTU includes the size, in bytes, of a largest data packet that the link layer of a communications protocol can pass onwards.

6. The method of claim 1, wherein the acknowledgment signal is sent after receipt of each data packet by the receiver responsive to the receiver being free of other tasks.

7. The method of claim 1, wherein the steps are applied in a network with a high bit error rate (BER) and a large number of nodes and switches, such that the data packets traverse a large number of links.

8. A system for recovering dropped data packets in a Data Center Ethernet (DCE) network, comprising:
   a transmitter for storing data packets for transmission in a replay buffer, the replay buffer accessible at a link layer of the network, and transmitting the data packets across a link layer in the DCE network, wherein each data packet includes a header having a field that indicates if the data packet is formatted for reliable recovery at the link layer; and
   a receiver for receiving the data packets transmitted across the link layer, and determining, at the link layer, whether a data packet has been dropped, wherein if a data packet is determined to have been dropped, the receiver sends a non-acknowledgement signal from the receiver to the transmitter in another data packet across the link layer indicating that the data packet has been dropped, and if a data packet is determined not to have been dropped, the receiver sends an acknowledgement signal to the transmitter in the other data packet across the link layer indicating that the data packet has been received the acknowledgement signal sent only after the last packet of the data packets is received at the receiver;

wherein the field in the header of the data packet is set while the packet is in transit between the transmitter and the receiver, the field enabling reliable recovery at the link layer, wherein setting the field to a first value causes links in the network to apply reliable recovery at the link layer to the data packet, and setting the field to a second value causes the data packet to pass through the links in the network without applying reliable recovery at the link layer to the data packet;

wherein if no acknowledgement signal is received after a timeout period, it is assumed that the data packet or the acknowledgement signal has been dropped, and wherein, in response to receipt of the non-acknowledgement signal at the transmitter or in response to no receipt of an acknowledgement signal at the transmitter after the timeout period, the transmitter retrieves the data packet from the replay buffer, at the link layer, and resends the data packet to the receiver across the link layer;

wherein the acknowledgement signal is received only after the last packet has been received by the recipient, responsive to the recipient being busy with other tasks.

9. The system of claim 8, wherein the data indicating that the data packet is formatted for reliable recovery at the link layer is included in a 2-byte field of the data packet header included in the data packet transmitted to the receiver.

10. The system of claim 8, wherein each data packet is assigned a packet sequence number, and the receiver determines whether a packet has been dropped by comparing a sequence number of a received packet with an expected sequence number, wherein if the sequence number of the received packet is not the same as the expected sequence number, the data packet is assumed to have been dropped.

11. The system of claim 8, wherein the timeout period is as long as the time it takes a packet to traverse the link from the transmitter to the receiver and back, the time it takes to compare a data packet sequence number to an expected sequence number and generate an acknowledgement signal or a non-acknowledgement signal, and maximum transmission unit (MTU) transmission and reception times.

12. The system of claim 11, wherein an MTU includes the size, in bytes, of a largest data packet that a given link layer of a communications protocol can pass onwards.

13. The system of claim 8, wherein the acknowledgment signal is sent after receipt of each data packet by the receiver responsive to the receiver being free from of tasks.

14. The system of claim 8, wherein the system is part of a network having a high bit error rate (BER) and a large number of nodes and switches, such that the data packets traverse a large number of links.

15. An apparatus for recovering dropped packets in a Data Center Ethernet (DCE) network, comprising:

a replay buffer for storing data packets, the replay buffer accessible at a link layer of the network, wherein each data packet includes a header having a field that indicates if the data packet is formatted for reliable recovery at the link layer; and a transmitter for transmitting the data packets to a receiver across a link layer in the DCE network, wherein the field in the header of the data packet is set while the packet is in transit between the transmitter and the receiver, the field enabling reliable recovery at the link layer, wherein setting the field to a first value causes links in the network to apply reliable recovery at the link layer to the data packet, and setting the field to a second value causes the data packet to pass through the links in the network without applying reliable recovery at the link layer to the data packet;

the link layer, in response to receipt of a non-acknowledgement signal from the receiver transmitted in another data packet across the link layer indicating that a data packet sent to the receiver has been dropped, or in response to no receipt of an acknowledgement signal transmitted in the other data packet across the link layer to the receiver indicating that a data packet has been received after a timeout period, from which it is assumed that the data packet or the acknowledgment signal has been dropped, the transmitter retrieves the packet from the replay buffer, at the link layer, and resends the data packet to the receiver across the link layer;

wherein the acknowledgement signal is received only after the last packet has been received by the recipient, responsive to the recipient being busy with other tasks.

16. The apparatus of claim 15, wherein the data indicating that the data packet is formatted for reliable recovery at the link layer is included in a 2-byte field of the data packet header included in the data packet transmitted to the receiver.

17. The apparatus of claim 15, wherein each data packet has a sequence number, and a data packet is determined to have been dropped by comparing a sequence number of a received packet with an expected sequence number, wherein if the sequence number of the received packet is not the same as the expected sequence number, the data packet is assumed to have been dropped.

18. The apparatus of claim 15, wherein the timeout period is as long as the time it takes a packet to traverse the link from the transmitter to the receiver and back, the time it takes to compare a data packet sequence number to an expected sequence number and generate an acknowledgement signal or a non-acknowledgement signal, and maximum transmission unit (MTU) transmission and reception times.

19. The apparatus of claim 15, wherein the acknowledgment signal is sent after receipt of each data packet by the receiver responsive to the receiver being free of other tasks.

20. The apparatus of claim 15, wherein the apparatus is part of a network having a high bit error rate (BER) and a large number of nodes and switches, such that the data packets traverse a large number of links.

* * * * *